(12) United States Patent
Moll et al.

(10) Patent No.: US 11,195,424 B2
(45) Date of Patent: Dec. 7, 2021

(54) METHOD AND SYSTEM FOR MONITORING THE STATE OF A RUNWAY ON WHICH AN AIRCRAFT IS ABLE TO TAXI

(71) Applicants: Airbus SAS, Blagnac (FR); Airbus Operations SAS, Toulouse (FR)

(72) Inventors: Fabien Moll, Blagnac (FR); Patrick Schuster, Blagnac (FR); Benjamin Klein, Toulouse (FR); Jean-François Virepinte, Toulouse (FR); Éric Le Roux, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/930,884

(22) Filed: Jul. 16, 2020

(65) Prior Publication Data
US 2021/0020058 A1    Jan. 21, 2021

(30) Foreign Application Priority Data

Jul. 18, 2019 (FR) ........................................ 1908133

(51) Int. Cl.
*G08G 5/06* (2006.01)
*G06T 7/529* (2017.01)
*B64F 1/00* (2006.01)
*G06K 9/46* (2006.01)
*G08G 5/00* (2006.01)

(52) U.S. Cl.
CPC ............ *G08G 5/065* (2013.01); *B64F 1/002* (2013.01); *G06K 9/4661* (2013.01); *G06T 7/529* (2017.01); *G08G 5/0026* (2013.01)

(58) Field of Classification Search
None
See application file for complete search history.

(56) References Cited

U.S. PATENT DOCUMENTS

| | | | |
|---|---|---|---|
| 8,116,989 B2* | 2/2012 | Journade | G08G 5/025 |
| | | | 702/34 |
| 9,299,261 B2* | 3/2016 | Jones | G08G 5/0013 |
| 10,202,204 B1* | 2/2019 | Daidzic | B64D 45/08 |
| 10,308,371 B1* | 6/2019 | Tiana | G01C 23/00 |

(Continued)

FOREIGN PATENT DOCUMENTS

| | | |
|---|---|---|
| FR | 2922072 A1 | 4/2009 |
| FR | 2930669 A1 | 10/2009 |
| FR | 2978736 A1 | 2/2013 |

OTHER PUBLICATIONS

French Search Report; priority document.

*Primary Examiner* — Fekadeselassie Girma
(74) *Attorney, Agent, or Firm* — Greer, Burns & Crain, Ltd.

(57) ABSTRACT

A system including at least one image acquisition module to acquire images of the environment of the aircraft and of the runway, a module to recognize in the images at least one element representative of at least one contaminant likely to influence the state of the runway, a module to determine at least one property of the contaminant or contaminants and a module to transmit to a user device the property or properties of the contaminant or contaminants. The system allows contaminants to be identified and to be located on the runway or in the environment of the aircraft.

13 Claims, 4 Drawing Sheets

(56) References Cited

U.S. PATENT DOCUMENTS

| | | | | |
|---|---|---|---|---|
| 2004/0032418 | A1* | 2/2004 | Cosman | G06T 7/33 |
| | | | | 345/645 |
| 2005/0074359 | A1* | 4/2005 | Krieger | A61L 9/145 |
| | | | | 422/28 |
| 2012/0218127 | A1* | 8/2012 | Kroen | G08G 5/006 |
| | | | | 340/945 |
| 2013/0127642 | A1* | 5/2013 | Maggiore | G08G 5/0021 |
| | | | | 340/947 |
| 2013/0327014 | A1* | 12/2013 | Moulebhar | F02K 3/065 |
| | | | | 60/226.2 |
| 2016/0351058 | A1* | 12/2016 | Wischmeyer | G08G 5/0039 |
| 2017/0137144 | A1* | 5/2017 | Georgin | B60T 8/1703 |
| 2017/0158177 | A1* | 6/2017 | Sharma | B60T 8/172 |
| 2019/0049360 | A1* | 2/2019 | Crafton | B05B 12/082 |
| 2019/0054906 | A1* | 2/2019 | Pedapudi | G08G 5/0013 |
| 2019/0172361 | A1* | 6/2019 | Schwindt | G08G 5/065 |
| 2019/0184601 | A1* | 6/2019 | Ley | B28B 23/0031 |
| 2019/0329755 | A1* | 10/2019 | Sheriff | F16D 66/028 |
| 2020/0080609 | A1* | 3/2020 | Muniraju | G01D 5/42 |
| 2020/0342769 | A1* | 10/2020 | Khan | B64D 43/00 |

* cited by examiner

_US 11,195,424 B2_

METHOD AND SYSTEM FOR MONITORING THE STATE OF A RUNWAY ON WHICH AN AIRCRAFT IS ABLE TO TAXI

CROSS-REFERENCES TO RELATED APPLICATIONS

This application claims the benefit of the French patent application No. 1908133 filed on Jul. 18, 2019, the entire disclosures of which are incorporated herein by way of reference.

BACKGROUND OF THE INVENTION

The present invention relates to the monitoring of the state of a runway on which an aircraft is able to taxi.

BACKGROUND OF THE INVENTION

The state of a runway may be affected by the presence of contaminants. In order for an aircraft to be able to taxi, takeoff and land on the runway under good conditions, it is necessary to be aware of its state. Until now, the only source of information allowing the state of the runway to be known corresponded to the air traffic services (ATS). However, the information on the state of a runway supplied by the ATS services is not accurate. The state of a runway coming from this information may then differ from the actual state of a runway. The documents FR 2930669 and FR 2978736 each describe a system that compares the performance characteristics of an aircraft obtained when braking and compares them to a model in order to determine the friction of the runway encountered by the aircraft. The system necessarily requires a braking action and does not differentiate the type of contaminant and the thickness of contaminant that result in this degraded friction. In order to discover the state of the runway (type of contaminant and thickness), the airport operators must still carry out a visual inspection of the runway. One solution envisaged by the inventors could comprise using mobile means, for example a sensor carried on board an automobile, but this solution would require an interruption of the traffic. Another solution could comprise using static sensors installed in the runway, but these sensors would be costly to implement, would only supply a very local measurement and they would be exposed to an environment that may affect their measurements.

SUMMARY OF THE INVENTION

An aim of the present invention is to overcome these drawbacks by providing a method and a system allowing the state of a runway to be precisely known.

For this purpose, the invention relates to a method for monitoring the state of a runway on which an aircraft is able to taxi, the aircraft having an airframe comprising at least one fuselage and at least one landing gear.

According to the invention, the method comprises at least:
a step for acquisition of images, implemented by at least one image acquisition module, comprising acquiring images of the environment of the aircraft and of the runway;
a recognition step, implemented by a recognition module, comprising recognizing in the images at least one element representative of at least one contaminant likely to influence the state of the runway;
a first determination step, implemented by a first determination module, comprising determining at least one property of the contaminant or contaminants;
a transmission step, implemented by a transmission module, comprising transmitting to a user device (8) the property or properties of the contaminant or contaminants.

Thus, by virtue of the method, the runway is monitored in real time without interruption of the traffic by means of the image acquisition modules and of the recognition module which allow contaminants to be identified and to be located on the runway or in the environment of the aircraft.

Furthermore, the method comprises the following steps which follow the recognition step:
a second determination step, implemented by a second determination module, comprising determining at least one characteristic associated with the element or elements recognized, if at least one element is recognized;
a comparison step, implemented by a comparison module, comprising comparing the characteristic or characteristics associated with the element or elements recognized with at least one characteristic associated with at least one modeled element, the modeled element or elements corresponding to the element or elements recognized;
the first determination step comprising determining at least one property of the contaminant or contaminants based on the comparison of the characteristic or characteristics associated with the element or elements recognized and on the characteristic or characteristics associated with the modeled element or elements.

In addition, the method comprises a speed acquisition step, implemented by a speed acquisition module, comprising acquiring a current speed of movement of the aircraft; the recognition step comprises recognizing in the images the following element or elements: at least one atomization plume of a contaminant caused by a passage of at least one landing gear wheel of the aircraft in a contaminant; the second determination step comprises determining, as a function of the current speed of movement, at least the following associated characteristics: at least one envelope of the atomization plume or plumes recognized, at least one intersection of the atomization plume or plumes recognized with the fuselage of the aircraft and at least one intersection of the plume or plumes recognized with at least one element of the airframe of the aircraft.

Furthermore, the method comprises:
a third determination step, implemented by a third determination module, comprising determining at least one modeling of the atomization plume or plumes recognized as a function of the aircraft speed of movement, the modeling or modelings being respectively determined for a type of contaminant and a depth of the contaminant and for an aircraft modeled with substantially identical configuration data;
a fourth determination step, implemented by a fourth determination module, comprising determining the characteristics modeled as a function of the aircraft speed of movement based on the modeling or on each of the modelings, each of the modeled characteristics being determined for a type and a depth of modeled contaminant and for an aircraft modeled with substantially identical configuration data.

Furthermore, the comparison step comprises correlating each of the characteristics associated with the element or elements recognized with each of the modeled characteristics corresponding to the characteristics associated with the element or elements recognized;

the first determination step comprises determining at least the following properties based on the correlation: the type of contaminant and the depth of the contaminant.

In addition, the recognition step comprises recognizing in the images the following element: at least a part of an object on the runway;
the second determination step comprises determining at least one characteristic associated with the part or parts of objects recognized;
the comparison step comprises comparing the characteristic or characteristics associated with the part or parts of objects recognized with at least one characteristic associated with at least one modeled object;
the first determination step comprises determining at least one property of the object or objects based on the comparison.

According to one particular feature, the recognition step comprises recognizing in the images the following element: at least a part of a flying object in the environment of the aircraft;
the second determination step comprises determining at least one characteristic associated with the part or parts of flying objects recognized;
the comparison step comprises comparing the characteristic or characteristics associated with the part or parts of flying objects recognized with at least one characteristic associated with at least one modeled flying object;
the first determination step comprises determining at least one property of the flying object or flying objects based on the comparison.

According to another particular feature, the recognition step comprises recognizing in the images the following element: at least one illuminated marking on the runway;
the second determination step comprises determining at least one characteristic associated with the illuminated marking or illuminated markings;
the comparison step comprises comparing the characteristic or characteristics associated with the illuminated marking or illuminated markings recognized with at least one characteristic associated with at least one modeled illuminated marking, the illuminated marking or illuminated markings corresponding to one or more known markings on the runway;
the first determination step comprises determining at least the property of the contaminant or contaminants based on the comparison, the property of the contaminant or contaminants corresponding to at least one position of at least one defective illuminated marking.

According to a first variant, the recognition step comprises recognizing in the images at least one of the following elements: at least one particular area of the runway or one texture of the runway;
the first determination step comprises determining that the particular area of runway corresponds to an area covered by a layer of rubber or of snow or that the texture of the runway is representative of cracking of the runway or of a hole.

According to a second variant, the recognition step comprising recognizing the following element: an angle of deviation between a steering angle of at least one wheel of the landing gear or gears and an angle of a current path of the wheel or wheels;
the first determination step comprising determining the following property based on the angle of deviation: an adhesion of the runway.

Advantageously, the transmission step comprises, furthermore, in transmitting to the user device the image or images of the contaminant or contaminants recognized or the image or images of the element or elements representative of the contaminant or contaminants.

Furthermore, the method comprises:
a position and time acquisition step, implemented by a position and time acquisition module, comprising acquiring a current position of the aircraft and a current time corresponding to the time of acquisition of the current position;
the first determination step comprising, furthermore, in determining at least one current position of the contaminant or contaminants based on the current position of the aircraft,
the transmission step comprising, furthermore, in transmitting to the user device the position or positions of the contaminant or contaminants and the current time.

The invention also relates to a system for monitoring the state of a runway on which an aircraft is able to taxi, the aircraft having an airframe comprising at least one fuselage and at least one landing gear.

According to the invention, the system comprises:
at least one image acquisition module configured for acquiring images of the environment of the aircraft and of the runway;
a recognition module configured for recognizing in the images at least one element representative of at least one contaminant likely to influence the state of the runway;
a first determination module configured for determining at least one property of the contaminant or contaminants;
a transmission module configured for transmitting to a user device the property or properties of the contaminant or contaminants.

According to the first embodiment, the system furthermore comprises:
a second determination module configured for determining at least one characteristic associated with the element or elements recognized, if at least one element is recognized;
a comparison module configured for comparing the characteristic or characteristics associated with the element or elements recognized with at least one characteristic associated with at least one modeled element, the modeled element or elements corresponding to the element or elements recognized;
the first determination module also being configured for determining at least one property of the contaminant or contaminants based on the comparison of the characteristic or characteristics associated with the element or elements recognized and of the characteristic or characteristics associated with the modeled element or elements.

The invention also relates to an aircraft, notably a transport plane, comprising a system for monitoring the state of a runway on which an aircraft is able to taxi, such as described hereinabove.

BRIEF DESCRIPTION OF THE DRAWINGS

The invention, with its features and advantages, will become more clearly apparent upon reading the description presented with reference to the appended drawings in which.

DETAILED DESCRIPTION OF THE PREFERRED EMBODIMENTS

Figure 1:
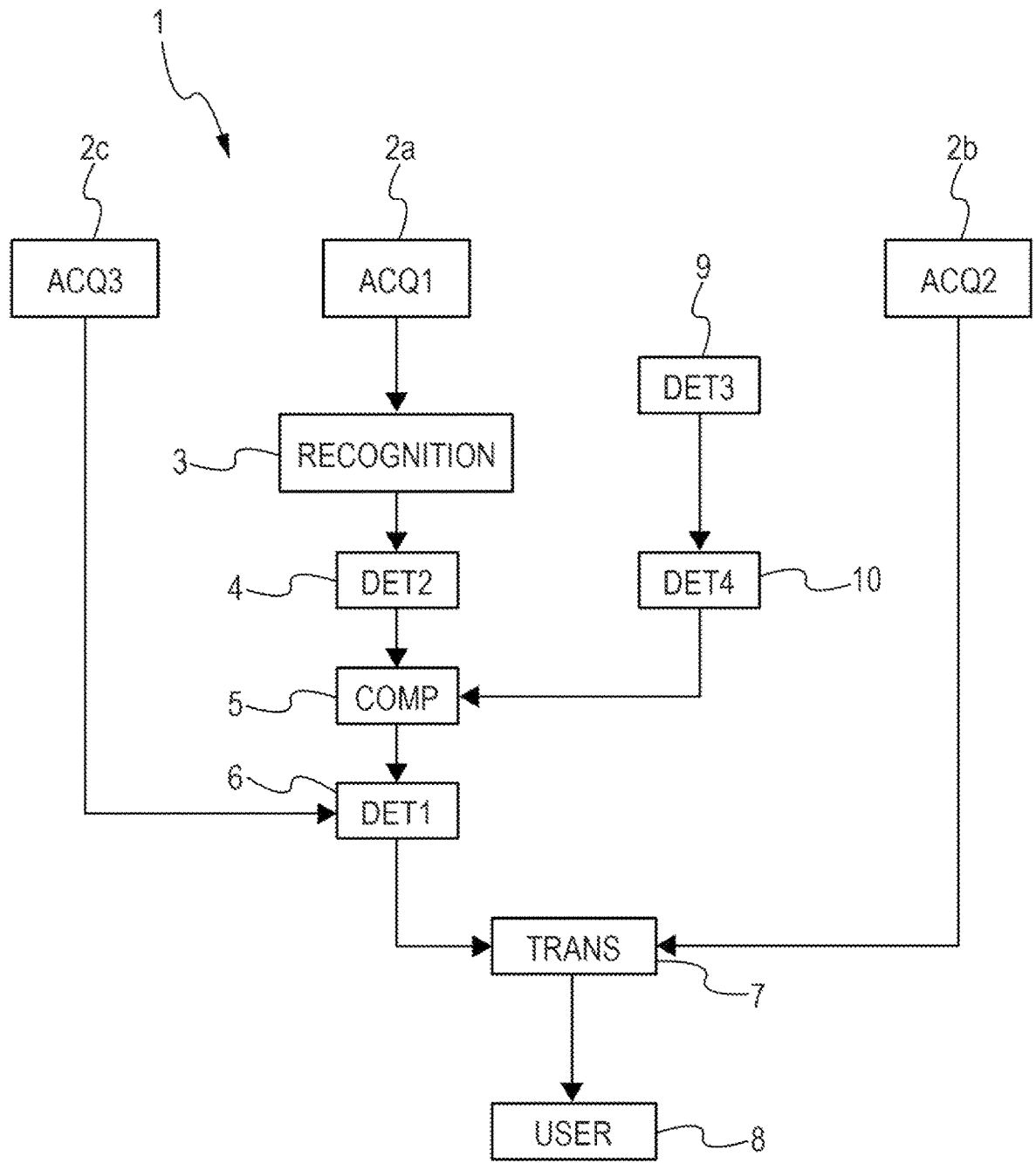
FIG. 1 shows schematically the monitoring system.

The system 1 for monitoring the state of a runway T on which an aircraft AC is able to taxi is shown schematically in FIG. 1. In the following part of the description, this system is referred to as "monitoring system."

The monitoring system 1 may be a source of information from a system for estimating the runway condition by data merging.

Generally speaking, an aircraft AC takes the form of an airframe comprising at least one fuselage F and at least one landing gear LG. The monitoring system 1 may be installed on board the aircraft AC.

The monitoring system 1 comprises at least one image acquisition module ACQ1 2a configured for acquiring images of the environment of the aircraft AC and of the runway T.

The environment of the aircraft AC may correspond to the space around the aircraft AC and to at least a part of the aircraft AC, such as one element of the airframe of the aircraft AC.

In a non-limiting manner, the image acquisition module or modules 2a comprise at least one of the following acquisition modules: at least one camera configured for acquiring images in the visible range of frequencies, at least one camera configured for acquiring images in the infrared range of frequencies, at least one radar or lidar sensor or at least one multispectral camera. The choice of the image acquisition module or modules 2a is determined according to the contaminant or contaminants which are desired to be recognized. The image acquisition module or modules 2a may also comprise high-definition cameras, such as 4K cameras.

Figure 4:
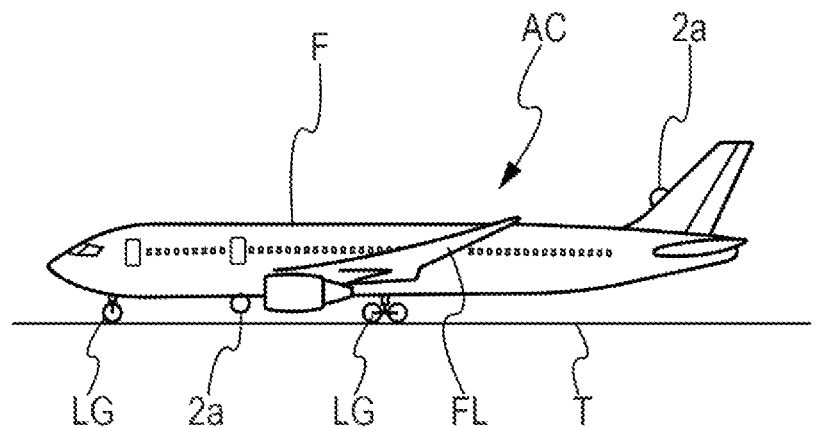
FIG. 4 shows a profile view of an aircraft with the monitoring system on board.

The image acquisition module or modules 2a equip the aircraft AC on appropriate parts of the aircraft AC in order to obtain a good view of the environment of the aircraft AC and of the aircraft AC in its environment. Preferably, the monitoring system 1 comprises at least one image acquisition module 2a on a vertical stabilizer VS and an image acquisition module on the belly of the aircraft AC (FIG. 4).

Generally, the current aircraft AC already have image acquisition modules 2a for providing the crew with a good view of the outside of the aircraft AC in order to assist the crew during maneuvers on the ground. These image acquisition modules 2a may also be used for the monitoring system 1.

Other positions of image acquisition modules 2a may be envisaged, notably for reproducing the view of the pilot from the cockpit or for acquiring images on the sides of the aircraft AC. In order to acquire images on the sides of the aircraft AC, the image acquisition modules 2a may be disposed in the passenger windows of the aircraft AC.

The monitoring system 1 also comprises:
- a recognition module RECOGNITION 3, configured so as to recognize at least one element representative of at least one contaminant likely to influence the state of the runway in the images acquired by the acquisition module or modules 2a;
- a determination module DET1 6 configured for determining at least one property of the contaminant or contaminants and
- a transmission module TRANS 7 configured for transmitting to a user device 8 the property or properties of the contaminant or contaminants.

The recognition module 3 may comprise a recognition algorithm based on image processing. The pixels that compose the images are processed in order to detect objects and to compare these objects with images from an image bank.

The recognition module 3 may also comprise a machine learning algorithm Using sets of data comprising the images and the objects, the algorithm can learn to recognize the objects.

The monitoring system 1 may also comprise a speed acquisition module ACQ2 2b configured for acquiring a current speed of movement of the aircraft AC.

Advantageously, the transmission module 7 is also configured for transmitting to the user device 8 the image or images of the contaminant or contaminants recognized or the image or images of the element or elements representative of the contaminant or contaminants.

Advantageously, the monitoring system 1 furthermore comprises a position and time acquisition module ACQ3 2c configured for acquiring a current position of the aircraft AC and a current time corresponding to the time of acquisition of the current position. The position and time acquisition module 2c may comprise a device for global positioning GPS (global positioning system). The determination module 6 is configured to furthermore determine at least one current position of the contaminant or contaminants based on the current position of the aircraft AC. The transmission module 7 is configured for furthermore transmitting to the user device 8 the position or positions of the contaminant or contaminants and the current time associated with the current position or positions of the aircraft AC from which the position or positions of the contaminant or contaminants is determined.

First Embodiment

According to a first preferred embodiment, the monitoring system 1 furthermore comprises:
- a determination module DET2 4 configured for determining at least one characteristic associated with the element or elements recognized, if at least one element is recognized by the recognition module 3;
- a comparison module COMP 5 configured for comparing the characteristic or characteristics associated with the element or elements recognized by the recognition module 3 with at least one characteristic associated with at least one modeled element.

The modeled element or elements correspond to the element or elements recognized by the recognition module 3 a digital modeling of which has been determined.

The determination module 6 is configured for determining at least one property of the contaminant or contaminants based on the comparison by the comparison module 5 of the characteristic or characteristics associated with the element or elements recognized and of the characteristic or characteristics associated with the modeled element or elements.

First Variant of the First Embodiment

In this first variant, the contaminant or contaminants correspond to water in liquid form, to water in solid form (snow or ice) or a mixture of water in liquid form and water in solid form. This contaminant or these contaminants may cover the runway T in the form of layers or sheets.

This contaminant or these contaminants may be categorized in the following manner
- standing water: sheet of water in liquid form produced by heavy precipitations and/or an insufficient drainage of the runway T with a depth of more than 3 mm;
- slush: water in liquid form saturated with snow which forms "spatters" when walking heavily on it;
- wet snow: sticky snow which has a tendency to form a snowball if it is compressed in the hands. In a non-limiting manner, the density of wet snow is approximately equal to 0.4 kg/L;
- dry snow: snow that can be blown if it is not compressed and which may fall in pieces if it is no longer compressed after a prior compression. In a non-limiting manner, the density of dry snow is approximately equal to 0.2 kg/L;
- compacted snow: snow that has been compressed. In a non-limiting manner, the coefficient of friction of compacted snow is approximately equal to 0.2;
- ice: solid water having, in a non-limiting manner, a coefficient of friction approximately less than 0.05.

Table 1 below shows the minimum depths of contaminants on a runway on top of which the takeoff of an aircraft AC is not recommended.

TABLE 1

| Type of contaminant | Minimum depth of contaminant |
| --- | --- |
| Standing water | 3 mm to 15 mm |
| Slush | 3 mm to 15 mm |
| Wet snow | 5 mm to 30 mm |
| Dry snow | 10 mm to 130 mm |

The contaminants may be divided into two separate categories according to the effects that they produce on the performance of the aircraft AC: hard contaminants and fluid contaminants.

Hard contaminants include compacted snow and ice. Their characteristic effect is to reduce frictional forces.

Fluid contaminants include, slush and loose snow. Their characteristic effects are to reduce the frictional forces and to cause precipitation drag and aquaplaning.

The precipitation drag is composed of a 'displacement drag' and of a 'spray impingement drag'.

Displacement drag is produced by the displacement of the fluid contaminant upon the passage of one or more wheels.

Spray impingement drag is produced by the atomization of the contaminant projected by one or more wheels onto the fuselage F of the aircraft AC. The wheel or wheels producing this spray impingement drag generally correspond to the wheel or wheels on the nose landing gear LG of the aircraft AC.

These drags can have positive effects through the improvement in the rate of deceleration during a rejected take-off or negative effects through the degradation in the rate of acceleration during a take-off.

A fluid contaminant limits the rate of acceleration of the aircraft AC. The deeper the layer of contaminant, the more reduced the rate of acceleration will be. On the other hand, for a hard contaminant covering the runway T, only the coefficient of friction is affected. The depth of the hard contaminant does not have any influence on the performance of the aircraft AC at take-off.

In the first variant of the first embodiment, the recognition module 3 is configured so as to recognize in the images the following element or elements: at least one atomization plume SP, CP of a contaminant caused by a passage of at least one landing gear wheel LG of the aircraft AC in a contaminant. The determination module 4 is configured for determining, as a function of the current speed of movement, at least the following associated characteristics: at least one envelope of the atomization plume or plumes SP, CP recognized, at least one intersection of the atomization plume or plumes SP, CP recognized with the fuselage of the aircraft AC and at least one intersection of the plume or plumes SP, CP recognized with at least one element of the airframe of the aircraft AC. In a non-limiting manner, the element or elements of the airframe may correspond to a flap or to the flaps FL of the aircraft AC or else to a wing or to the wings of the aircraft AC.

In the first variant of the first embodiment, the monitoring system 1 furthermore comprises:
- a determination module DET3 9 configured for determining at least one modeling of the atomization plume or plumes SP, CP recognized as a function of the aircraft speed of movement AC;
- a determination module DET4 10 configured for determining the characteristics modeled as a function of the aircraft speed of movement AC based on the modeling or on each of the modelings.

The modeling or modelings are respectively determined for a type of contaminant and a depth of the contaminant and for a modeled aircraft AC having substantially identical configuration data. Each of the modeled characteristics is determined for a type and a depth of modeled contaminant and for a modeled aircraft AC having substantially identical configuration data.

The configuration data may comprise the mass of the aircraft AC, the position of the flaps and slats, the braking mode of the aircraft AC, etc.

Figure 3:
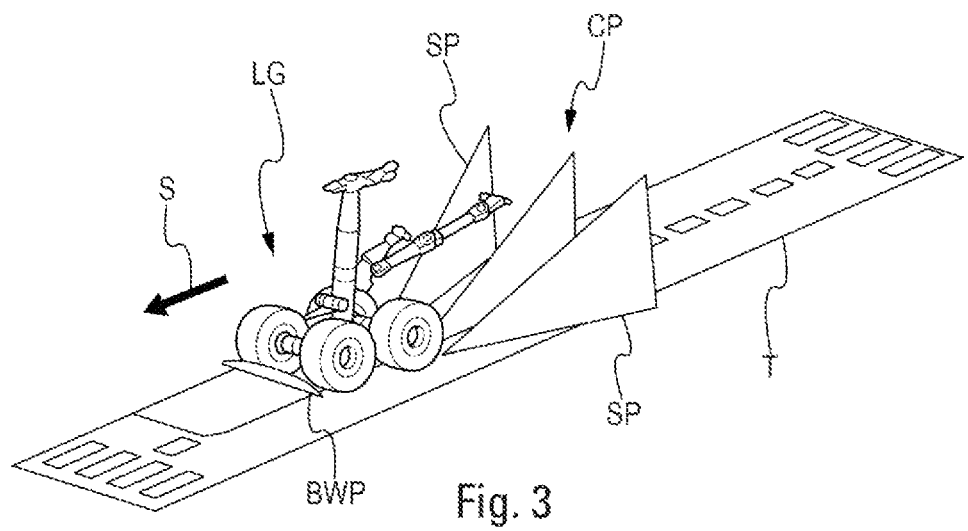
FIG. 3 shows in perspective a landing gear generating atomization plumes.
Figure 7:
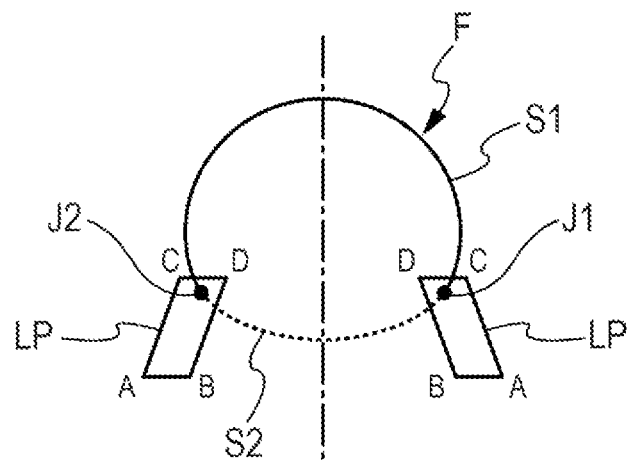
FIG. 7 shows a transverse cross-section of an aircraft fuselage.
Figure 8:
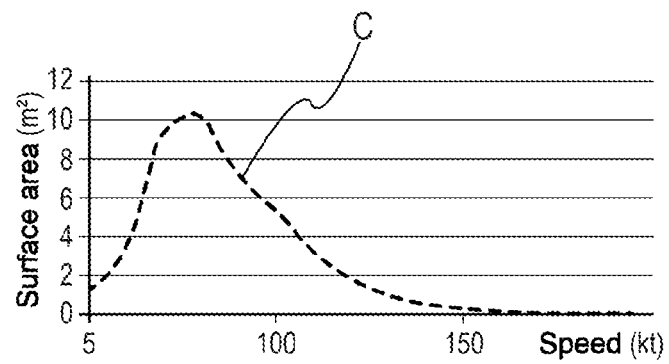
FIG. 8 shows one example of a curve of variation of a surface area reached by an atomization plume as a function of the speed of the aircraft.

The atomization plumes SP, CP, BWP generated by the wheels of the aircraft landing gear LG passing through fluid contaminants, such as water or slush, are complex elements. Indeed, the passage of the wheels generates various types of atomization plumes (FIG. 3 and FIG. 7):
- the bow-wave plume BWP or displacement drag coming from the accumulation of contaminant in front of the wheels. This type of plume does not play a significant role and its size is not important;
- the side plumes SP formed on either side of the wheel;
- the central plumes CP which are the consequence of a configuration of landing gear LG having wheels side-by-side. These plumes correspond to the intersections of the plumes generated between two wheels side-by-side.

The arrow S indicates the direction of movement of the aircraft AC.

The generation of the plumes SP, CP, BWP depends:
- on the speed of movement of the aircraft AC on the runway T;
- on the dimensions of the wheels, on their characteristics and on their loading;
- on the configuration of the landing gear LG;
- on the depth and on the specific gravity of the contaminant.

At low speed of the aircraft AC, the shape of the plume is dominated by the shape of the bow-wave plume BWP for which the fluid contaminant is pushed in front of each of the wheels. At this speed, few atomization plumes SP are generated on the sides of the wheels. However, as the speed of the aircraft AC increases, the bow-wave plumes BWP decrease in force and become flatter and flatter, while the side plumes SP increase in force and in height.

For speeds close to aquaplaning conditions, the side plumes SP reach their maximum height.

For even higher speeds, the height of the side plumes SP decreases and the bow-wave plumes BWP decrease even more significantly.

At the moment the aircraft AC starts to take off (rotation phase), the plumes SP, CP, BWP generated by the nose gear LG disappear. In addition, because of the inclination of the aircraft AC during the rotation phase, the plumes SP, CP, BWP generated by the rear landing gear LG encounter a large part of the fuselage F of the aircraft AC.

As soon as the aircraft AC has taken off, there is no longer any generation of plumes SP, CP, BWP.

The configuration of the landing gear LG also represents an important parameter in the generation of plumes SP, CP, BWP. For example, in configurations with multiple rows of wheels, such as the 'dual tandem' configuration, only the side plumes LP generated on the outer sides of the wheels are taken into account.

Furthermore, in the presence of a central landing gear, the assumption is made that the leg of the central landing gear stops the propagation of the central plume CP.

Figure 5:
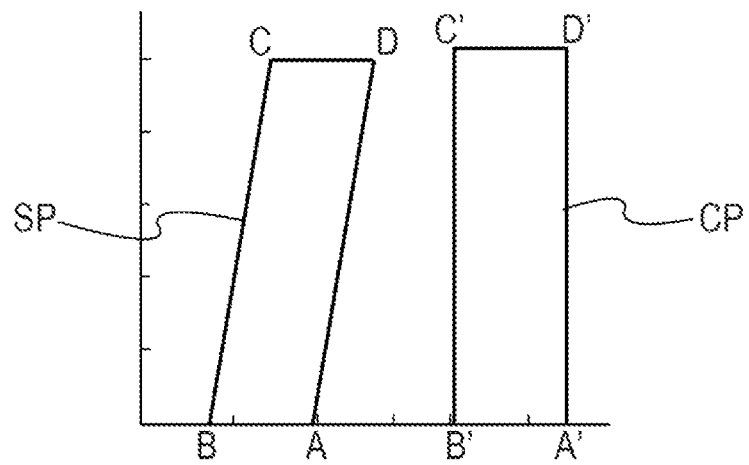
FIG. 5 shows a modeling of a side plume and of a central plume.
Figure 6:
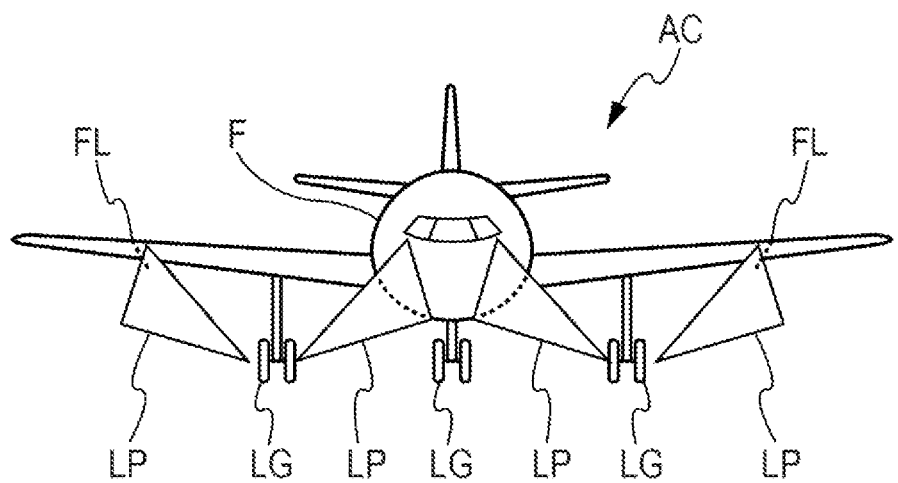
FIG. 6 shows schematically a front view of an aircraft whose landing gears generate atomization plumes.

The side atomization plume LP presents an angle that varies between 10° and 22° with respect to a vertical perpendicular to the runway T (FIG. 5). The angle varies significantly with the speed, the depth of the contaminant and, to a lesser extent, with the geometry of the wheel.

The modeling of the atomization plume allows the angle of the plume LP behind the nose gear LG to be obtained using:
  the speed of movement of the aircraft AC on the ground;
  the loading exerted on the nose gear LG;
  the side wind;
  the depth of the contaminant; and
  the density of the contaminant.

The determination module 9 may be carried on board the aircraft AC.

The modeling allows, for each type of contaminant and each depth of contaminant, the following to be obtained:

- a modeled envelope of atomization plume;
- an intersection of the atomization plume with the fuselage F of the aircraft AC;
- an intersection between the atomization plume and the flaps FL of the aircraft AC.

The modeling also makes at least the following assumptions:

- the contaminant is distributed over the whole runway with an equal depth;
- the contaminant exhibits a uniform density and a constant dynamic coefficient of viscosity;
- the bow-wave plumes BWP and the displacement drags are not taken into account;
- the effect of the wind on the plumes SP, CP, BWP is neglected.

According to one variant of the modeling, the potential surface treatments (gritting, or other treatment) are not taken into account.

According to another variant of the modeling, these potential treatments are taken into account by considering a specific gravity associated with this treatment and a recognition of the presence of the treatment via the acquired images.

In order to know the intersections between the plumes SP, CP and the aircraft, the modeling takes into account the horizontal and vertical stabilizers, the landing gear legs and the flaps FL. Furthermore, the shape of the wings is assumed to be a trapezium or a rectangle. The rear of the fuselage F of the aircraft AC is assumed to be a cone. The fuselage F is taken as two sections of circle assembled together: a first section of circle S1 corresponds to the upper part of the fuselage F and a second section of circle S2 corresponds to the lower part of the fuselage F. The junctions J1, J2 between the two sections of circle are referred to as "junction points."

The side plumes LP are assumed to be parallelograms ABCD. The central plumes CP are assumed to be rectangles A'B'C'D' (FIGS. 5 and 8).

For example, the calculation of the surface area of the fuselage F that receives a side plume LP corresponds to a determination of the intersection between the sections of circle representing the fuselage F and the parallelogram ABCD representing the side plume (FIG. 7).

The determination of the intersection is carried out according to the following steps:

If a junction point J1, J2 is included in the parallelogram ABCD, the length of the first circular section S1 included in the parallelogram ABCD and the second circular section S2 included in the parallelogram ABCD are calculated. The surface area of the fuselage F that receives a side plume is therefore equal to twice the sum of the two lengths.

If a junction point J1, J2 is above the parallelogram ABCD, the length of the first circular section S1 included in the parallelogram ABCD is calculated, otherwise the length of the second circular section S2 included in the parallelogram ABCD is calculated.

Furthermore, the modeling takes into account the variation over time of the configuration of the landing gear LG. The surface of the fuselage F that receives a side plume LP is therefore equal to twice the calculated length.

For the calculation of the surface area of the rear of the aircraft AC that receives a side plume LP, the modeling amounts to determining the intersection between a circle and a parallelogram ABCD.

FIG. 8 shows a curve C representative of one example of modeled time variation of the surface area of the rear of the aircraft AC that receives the plume CP, LP as a function of the speed of movement of the aircraft AC in knots (1 knot is substantially equal to 1.852 km/h or 1.151 mph).

According to the first variant of the first embodiment, the comparison module 5 is configured so as to correlate each of the characteristics associated with the element or elements recognized with each of the modeled characteristics corresponding to the characteristics associated with the element or elements recognized. The determination module 6 is configured for determining at least the following properties based on the correlation: the type of contaminant and the depth of the contaminant.

The correlation may amount to finding the best correlation between the plume CP, LP recognized and the modeled plume. The method for determining the correlation may be the least-squares method. A confidence score may also be calculated in parallel.

Second Variant of the First Embodiment

According to a second variant of the first embodiment, the contaminant corresponds to an object on the runway T. The object may be an animate object such as a human or an animal or else an inanimate object.

The recognition module 3 is configured for recognizing in the images the following element: at least a part of an object on the runway T.

The object may be an animate object such as a human or an animal or else an inanimate object.

Preferably, the acquisition module 2a comprises a radar.

The determination module 4 is configured for determining at least one characteristic associated with the part or parts of objects recognized;

The comparison module 5 is configured for comparing the characteristic or characteristics associated with the part or parts of objects recognized with at least one characteristic associated with at least one modeled object.

The modeled objects may be images stored in an image bank.

The determination module 6 is configured for determining at least one property of the object or objects based on the comparison.

Third Variant of the First Embodiment

According to a third variant of the first embodiment, the contaminant corresponds to a flying object in the environment of the aircraft AC. The object may be a bird, for example.

According to the third variant of the first embodiment, the recognition module 3 is configured for recognizing in the images the following element: at least a part of a flying object in the environment of the aircraft AC.

The determination module 4 is configured for determining at least one characteristic associated with the part or parts of flying objects recognized.

The comparison module 5 is configured for comparing the characteristic or characteristics associated with the part or parts of flying objects recognized with at least one characteristic associated with at least one modeled flying object.

The determination module 6 is configured for determining at least one property of the flying object or flying objects based on the comparison.

Fourth Variant of the First Embodiment

According to a fourth variant of the first embodiment, the contaminant corresponds to a missing or worn-off marking on the ground. The missing marking on the ground may correspond to a defective illuminated marking.

According to the fourth variant of the first embodiment, the recognition module 3 is configured for recognizing in the images the following element: at least one illuminated marking on the runway.

The determination module 4 is configured for determining at least one characteristic associated with the illuminated marking or markings.

The comparison module 5 is configured for comparing the characteristic or characteristics associated with the illuminated marking or markings recognized with at least one characteristic associated with at least one modeled illuminated marking. The modeled illuminated marking or markings correspond to one or more known markings on the runway T.

The determination module 6 is configured for determining at least the property of the contaminant or contaminants based on the comparison. The property of the contaminant or contaminants corresponds to at least one position of at least one defective illuminated marking.

Second Embodiment

In the second embodiment, the determination module 4 and the comparison module 5 are generally not required.

First Variant of the Second Embodiment

According to a first variant of the second embodiment, the recognition module 3 is configured for recognizing in the images at least one of the following elements: at least one particular area of the runway T or one texture of the runway T.

The determination module 6 is configured for determining that the particular area of runway T corresponds to an area covered by a layer of rubber or of snow or that the texture of the runway T is representative of cracking of the runway T or of a hole.

Second Variant of the Second Embodiment

According to a second variant of the second embodiment, the recognition module 3 is configured so as to recognize the following element: an angle of deviation between a steering angle of at least one wheel of the landing gear or gears and an angle of a current path of the wheel or wheels.

The determination module 6 is configured for determining the following property based on the angle of deviation: an adhesion of the runway T.

Figure 2:
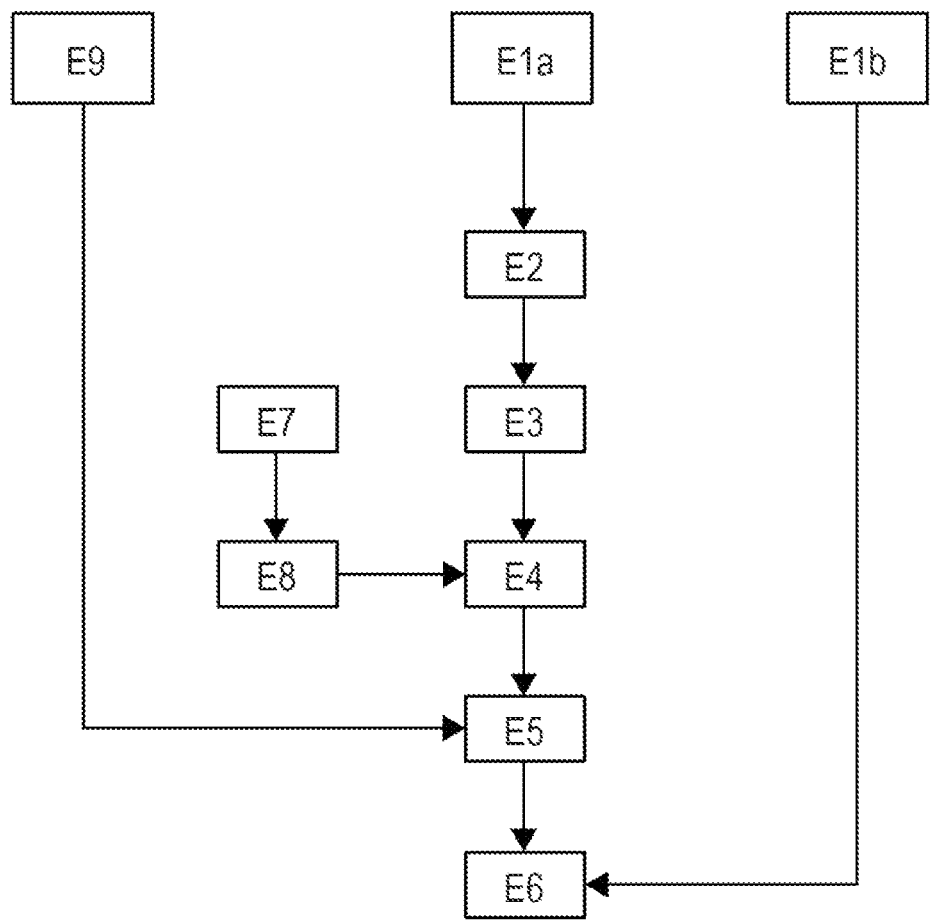
FIG. 2 shows schematically the monitoring method.

The invention also relates to a method for monitoring the state of a runway T on which the aircraft AC is able to taxi (FIG. 2).

The monitoring method comprises at least:
- a step E1a for acquisition of images, implemented by the image acquisition module or modules 2a, comprising acquiring images of the environment of the aircraft AC and of the runway T;
- a recognition step E2, implemented by the recognition module 3, comprising recognizing in the images at least one element representative of at least one contaminant likely to influence the state of the runway T;
- a determination step E5, implemented by the determination module 6, comprising determining at least one property of the contaminant or contaminants;
- a transmission step E6, implemented by the transmission module 7, comprising transmitting to the user device 8 the property or properties of the contaminant or contaminants.

The monitoring method may comprise a speed acquisition step E1b, implemented by the speed acquisition module 2b, comprising acquiring the current speed of movement of the aircraft AC.

Advantageously, the transmission step E6 comprises, furthermore, in transmitting to the user device 8 the image or images of the contaminant or contaminants recognized or the image or images of the element or elements representative of the contaminant or contaminants.

Furthermore, the monitoring method may comprise, furthermore, a step E9 for acquiring position and time, implemented by the position and time acquisition module 2c, comprising acquiring the current position of the aircraft AC and the current time corresponding to the time of acquisition of the current position. The determination step E5 comprises, furthermore, in determining at least one current position of the contaminant or contaminants based on the current position of the aircraft AC. The determination of the current position of the contaminant or contaminants may be achieved by merging information from an electro-optical acquisition module 2a (camera/lidar) with a radiofrequency acquisition module 2a (radar). The step E6 comprises, furthermore, in transmitting to the user device 8 the position or positions of the contaminant or contaminants and the current time associated with the current position or positions of the aircraft AC based on which the position or positions of the contaminant or contaminants is/are determined.

According to the first embodiment, the monitoring method furthermore comprises the following steps which follow the recognition step E2:

a determination step E3, implemented by the determination module 4, comprising determining at least one characteristic associated with the element or elements recognized, if at least one element is recognized;

a comparison step E4, implemented by the comparison module 5, comprising comparing the characteristic or characteristics associated with the element or elements recognized with at least one characteristic associated with at least one modeled element, the modeled element or elements corresponding to the element or elements recognized.

The determination step E5 comprises determining at least one property of the contaminant or contaminants based on the comparison of the characteristic or characteristics associated with the element or elements recognized and of the characteristic or characteristics associated with the modeled element or elements.

According to the first variant, the recognition step E2 may comprise recognizing in the images the following element or elements: at least one atomization plume SP, CP, BWP of a contaminant caused by a passage of at least one landing gear wheel LG of the aircraft AC in a contaminant.

The determination step E3 may consist in determining, as a function of the current speed of movement, at least the following associated characteristics: at least one envelope of the atomization plume or plumes SP, CP, BWP recognized, at least one intersection of the atomization plume or plumes SP, CP, BWP recognized with the fuselage of the aircraft AC and at least one intersection of the plume or plumes SP, CP, BWP recognized with the flap or flaps of the aircraft AC.

The monitoring method may furthermore comprise:

a determination step E7, implemented by the determination module 9, comprising determining at least one modeling of the atomization plume or plumes SP, CP, BWP recognized as a function of the aircraft speed of movement AC. The modeling or modelings are respectively determined for a type of contaminant and a depth of the contaminant and for a modeled aircraft AC having substantially identical configuration data.

a determination step E8, implemented by the determination module 10, comprising determining the characteristics modeled as a function of the aircraft speed of movement AC based on the modeling or on each of the modelings, each of the modeled characteristics being determined for a type and a depth of modeled contaminant and for a modeled aircraft AC having substantially identical configuration data.

The comparison step E4 comprises correlating each of the characteristics associated with the element or elements recognized with each of the modeled characteristics corresponding to the characteristics associated with the element or elements recognized. The determination step E5 comprises determining at least the following properties based on the correlation: the type of contaminant and the depth of the contaminant.

According to the second variant, the recognition step E2 comprises recognizing in the images the following element: at least a part of an object on the runway T. The determination step E3 comprises determining at least one characteristic associated with the part or parts of objects recognized. The comparison step E4 comprises comparing the characteristic or characteristics associated with the part or parts of objects recognized with at least one characteristic associated with at least one modeled object. The determination step E5 comprises determining at least one property of the object or objects based on the comparison.

According to the third variant, the recognition step E2 comprises recognizing in the images the following element: at least a part of a flying object in the environment of the aircraft AC. The determination step E3 comprises determining at least one characteristic associated with the part or parts of flying object recognized. The comparison step E4 comprises comparing the characteristic or characteristics associated with the part or parts of flying objects recognized with at least one characteristic associated with at least one modeled flying object. The determination step E5 comprises determining at least one property of the flying object or objects based on the comparison.

According to the fourth variant, the recognition step E2 comprises recognizing in the images the following element: at least one illuminated marking on the runway T. The determination step E3 comprises determining at least one characteristic associated with the illuminated marking or markings. The comparison step E4 comprises comparing the characteristic or characteristics associated with the illuminated marking or markings recognized with at least one characteristic associated with at least one modeled illuminated marking, the modeled illuminated marking or markings corresponding to one or more known markings on the runway T. The determination step E5 comprises determining at least the property of the contaminant or contaminants based on the comparison, the property of the contaminant or contaminants corresponding to at least one position of at least one defective illuminated marking.

According to the first variant of the second embodiment, the recognition step E2 comprises recognizing in the images at least one of the following elements: at least one particular area of the runway T or one texture of the runway T. The determination step E5 comprises determining that the particular area of runway T corresponds to an area covered by a layer of rubber or of snow or that the texture of the runway T is representative of cracking of the runway T or of a hole.

According to the second variant of the second embodiment, the recognition step E2 comprises recognizing the following element: an angle of deviation between a steering angle of at least one wheel of the landing gear or gears and an angle of a current path of the wheel or wheels. The determination step E5 comprises determining the following property based on the angle of deviation: an adhesion of the runway T.

The user device 8 may be a center for the maintenance of the runway T.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring a state of a runway on which an aircraft is able to taxi, the aircraft having an airframe comprising at least one fuselage and at least one landing gear, comprising:

acquiring images, implemented by at least one image acquisition module, comprising acquiring images of an environment of the aircraft and of the runway;

recognizing, implemented by a recognition module, comprising recognizing in the images at least one element representative of at least one contaminant likely to influence the state of the runway;

a second determining, implemented by a second determination module, comprising determining at least one characteristic associated with the at least one element recognized, if at least one element is recognized;

a first determining, implemented by a first determination module, comprising determining at least one property of the at least one contaminant;

transmitting, implemented by a transmission module, comprising transmitting to a user device the at least one property of the at least one contaminant, acquiring a speed, implemented by a speed acquisition module, comprising acquiring a current speed of movement of the aircraft;

the recognizing step comprising recognizing in the images the following element or elements: at least one atomization plume of a contaminant caused by a passage of at least one landing gear wheel of the aircraft in a contaminant; and the second determining step comprises determining, as a function of the current speed of movement, at least the following associated characteristics:

at least one envelope of the at least one atomization plume recognized, and at least one intersection of the at least one atomization plume recognized with the fuselage of the aircraft or with at least one element of the airframe of the aircraft.

2. The method as claimed in claim 1, further comprising:

comparing, implemented by a comparison module, comprising comparing the at least one characteristic associated with the at least one element recognized with at least one characteristic associated with at least one modeled element, the modeled at least one element corresponding to the at least one element recognized, the first determining step comprising determining at least one property of the at least one contaminant based on the comparison of the at least one characteristic associated with the at least one element recognized and of the at least one characteristic associated with the modeled at least one element.

3. The method as claimed in claim 1, further comprising:

a third determining, implemented by a third determination module, comprising determining at least one modeling of the at least one atomization plume recognized as a function of the aircraft speed of movement, the at least one modeling being respectively determined for a type of contaminant and a depth of the contaminant and for a modeled aircraft having substantially identical configuration data;

a fourth determining, implemented by a fourth determination module, comprising determining the characteristics modeled as a function of the aircraft speed of movement based on the at least one modeling, each of the modeled characteristics being determined for a type and a depth of modeled contaminant and for a modeled aircraft having substantially identical configuration data.

4. The method as claimed in claim 1,
wherein the comparing step comprises correlating each of the characteristics associated with the at least one element recognized with each of the modeled characteristics corresponding to the characteristics associated with the at least one element recognized; and wherein the first determining step comprises determining at least the following properties based on a correlation: the type of contaminant and a depth of the contaminant.

5. The method as claimed in claim 1,
wherein the recognizing step comprises recognizing in the images the following element: at least a part of an object on the runway;

wherein the second determining step comprises determining at least one characteristic associated with the at least one part of an object recognized;

wherein the comparing step comprises comparing the at least one characteristic associated with the at least one part of an object recognized with at least one characteristic associated with at least one modeled object;

wherein the first determining step comprises determining at least one property of the at least one object based on the comparison.

6. The method as claimed in claim 1,
wherein the recognizing step comprises recognizing in the images the following element: at least a part of a flying object in an environment of the aircraft;

wherein the second determining step comprises determining at least one characteristic associated with the at least one part of a flying object recognized;

wherein the comparing step comprises comparing the at least one characteristic associated with the at least one part of a flying object recognized with at least one characteristic associated with at least one modeled flying object;

wherein the first determining step comprises determining at least one property of the at least one flying object based on the comparison.

7. The method as claimed in claim 1,
wherein the recognizing step comprises recognizing in the images the following element: at least one illuminated marking on the runway;

wherein the second determining step comprises determining at least one characteristic associated with the at least one illuminated marking;

wherein the comparing step comprises comparing the at least one characteristic associated with the at least one illuminated marking recognized with at least one characteristic associated with at least one modeled illuminated marking, the at least one modeled illuminated marking corresponding to at least one known marking on the runway;

wherein the first determining step comprises determining at least the property of the at least one contaminant based on the comparison, the property of the at least one contaminant corresponding to at least one position of at least one defective illuminated marking.

8. The method as claimed in claim 1,
wherein the recognizing step comprises recognizing in the images at least one of the following elements: at least one particular area of the runway or one texture of the runway; and wherein the first determining step comprises determining that the particular area of runway corresponds to an area covered by a layer of rubber or of snow or that the texture of the runway is representative of cracking of the runway or of a hole.

9. The method as claimed in claim 1,
wherein the recognizing step comprises recognizing the following element: an angle of deviation between a steering angle of at least one wheel of the at least one landing gear and an angle of a current path of the at least one wheel; and wherein the first determining step comprises determining the following property based on the angle of deviation: an adhesion of the runway.

10. The method as claimed in claim 1, wherein the transmission step comprises, furthermore, in transmitting to the user device the at least one image of the at least one contaminant recognized or the at least one image of the at least one element representative of the at least one contaminant.

11. The method as claimed in claim 1, further comprising:

acquiring a position and time, implemented by a position and time acquisition module, comprising acquiring a current position of the aircraft and a current time corresponding to the time of acquisition of the current position;

the first determining step comprising, furthermore, determining at least one current position of the at least one contaminant based on the current position of the aircraft, the transmitting step comprising, furthermore, transmitting to the user device the at least one position of the at least one contaminant and the current time.

12. A system for monitoring a state of a runway on which an aircraft is able to taxi, takeoff and land, the aircraft having an airframe comprising at least one fuselage and at least one landing gear, the monitoring system comprising:

an image acquisition module configured to acquire images of an environment of the aircraft and of the runway;

a recognition module configured to recognize in the images at least one element representative of at least one contaminant likely to influence the state of the runway;

a second determination module, configured to determine at least one characteristic associated with the at least one element recognized, if at least one element is recognized;

a first determination module configured to determine at least one property of the at least one contaminant;

a transmission module configured to transmit to a user device the at least one property of the at least one contaminant, wherein the monitoring system comprises a speed acquisition module configured to acquire a current speed of movement of the aircraft;

wherein the recognition module is configured to recognize in the images the following at least one element: at least one atomization plume of a contaminant caused by a passage of at least one landing gear wheel of the aircraft in a contaminant; and wherein the second determination module is configured to determine, as a function of the current speed of movement, at least the following associated characteristics:
at least one envelope of the atomization at least one plume recognized, and
at least one intersection of the at least one atomization plume recognized with the fuselage of the aircraft or with at least one element of the airframe of the aircraft.

13. An aircraft comprising a system for monitoring the state of a runway on which an aircraft is able to taxi, takeoff and land, as claimed in claim 12.

* * * * *